United States Patent
Chen et al.

(10) Patent No.: US 11,554,482 B2
(45) Date of Patent: Jan. 17, 2023

(54) SELF-LEARNING INDUSTRIAL ROBOTIC SYSTEM

(71) Applicant: Hitachi, Ltd., Tokyo (JP)

(72) Inventors: Heming Chen, Novi, MI (US); Yi-Chu Chang, Farmington Hills, MI (US)

(73) Assignee: Hitachi, Ltd., Tokyo (JP)

( * ) Notice: Subject to any disclaimer, the term of this patent is extended or adjusted under 35 U.S.C. 154(b) by 250 days.

(21) Appl. No.: 16/931,248

(22) Filed: Jul. 16, 2020

(65) Prior Publication Data
US 2022/0016763 A1 Jan. 20, 2022

(51) Int. Cl.
G05B 19/04 (2006.01)
G05B 19/18 (2006.01)
B25J 9/16 (2006.01)
G05B 13/02 (2006.01)
B25J 13/08 (2006.01)

(52) U.S. Cl.
CPC ............ B25J 9/1605 (2013.01); B25J 9/161 (2013.01); B25J 9/163 (2013.01); B25J 13/08 (2013.01); G05B 13/027 (2013.01)

(58) Field of Classification Search
CPC . B25J 9/1605; B25J 9/161; B25J 9/163; B25J 13/08; B25J 9/1671; G05B 13/027; G05B 2219/39311; G05B 2219/40499
USPC ....................................................... 700/253
See application file for complete search history.

(56) References Cited

U.S. PATENT DOCUMENTS

| | | | | |
|---|---|---|---|---|
| 6,157,873 A | * | 12/2000 | DeCamp | B25J 9/1671 700/186 |
| 6,268,853 B1 | * | 7/2001 | Hoskins | G05B 23/024 715/965 |
| 9,498,704 B1 | * | 11/2016 | Cohen | A63F 13/67 |
| 9,671,777 B1 | * | 6/2017 | Aichele | B25J 9/1666 |
| 9,811,074 B1 | * | 11/2017 | Aichele | B25J 9/1656 |
| 9,840,007 B1 | * | 12/2017 | Kuffner | G05D 1/0088 |
| 2007/0213874 A1 | | 9/2007 | Oumi et al. | |
| 2012/0324415 A1 | * | 12/2012 | Keibel | G05B 19/4097 717/100 |
| 2013/0346348 A1 | * | 12/2013 | Buehler | B25J 9/1671 901/31 |
| 2016/0257000 A1 | * | 9/2016 | Guerin | B25J 9/1671 |
| 2017/0021501 A1 | * | 1/2017 | Kimoto | B25J 9/1671 |
| 2018/0089553 A1 | * | 3/2018 | Liu | G06N 3/008 |
| 2019/0202055 A1 | * | 7/2019 | Wang | B25J 9/1671 |
| 2019/0224844 A1 | | 7/2019 | Tsuda et al. | |

(Continued)

FOREIGN PATENT DOCUMENTS

WO WO-2022081454 A1 * 4/2022 ............ B25J 9/0084

*Primary Examiner* — B M M Hannan
(74) *Attorney, Agent, or Firm* — Procopio, Cory, Hargreaves & Savitch LLP

(57) ABSTRACT

Example implementations described herein are directed to a simulation environment for a real world system involving one or more robots and one or more sensors. Scenarios are loaded into a simulation environment having one or more virtual robots corresponding to the one or more robots, and one or more virtual sensors corresponding to the one or more virtual system to train a control strategy model from reinforcement learning, which is subsequently deployed to the real world environment. In cases of failure of the real world environment, the failures are provided to the simulation environment to generate an updated control strategy model for the real world environment.

14 Claims, 10 Drawing Sheets

(56) References Cited

U.S. PATENT DOCUMENTS

| | | | |
|---|---|---|---|
| 2020/0030979 A1* | 1/2020 | Bank | B25J 13/08 |
| 2021/0023694 A1* | 1/2021 | Chen | G06T 19/006 |
| 2021/0031364 A1* | 2/2021 | Groz | B25J 9/1689 |
| 2021/0107157 A1* | 4/2021 | Bai | B25J 9/1692 |
| 2021/0138651 A1* | 5/2021 | Mcgregor | G06F 30/20 |
| 2021/0158141 A1* | 5/2021 | Taylor | G05B 13/027 |
| 2021/0331311 A1* | 10/2021 | Fu | G06V 10/82 |

* cited by examiner

SELF-LEARNING INDUSTRIAL ROBOTIC SYSTEM

BACKGROUND

Field

The present disclosure is generally directed to industrial robotic systems, and more specifically, to self-learning implementations of industrial robotic systems.

Related Art

In related art implementations, robots are being used more widely across the globe for a variety of purposes, such as manufacturing, warehouse management, transportation, search and rescue, cleaning, and even surgery. As these tasks are becoming more complex, the traditional robotic system development method is now encountering several issues.

The first issue in the related art is the long lead time to manually program a robotic system for complex jobs. As industrial robots are deeply involved in smart manufacturing systems, the programs running on these robots are also becoming larger and more resource intensive. A skilled robotics programmer needs to understand the job requirement, design the workflow of robot, write the program and test it until the robot works substantially flawlessly, which can often take days if not weeks to complete. On top of that, skilled programmers can be hard to find; their programming skills can directly impact the quality and efficiency of the robot operation, even as far as affecting the entire production line.

The second issue is that the hard-coded robotic program lacks flexibility to adapt to operating condition changes in the production environment. As the robot can only operate based on the condition known to the programmer at the time of programming, any change in operating condition can easily confuse the robot and cause production downtime. For example, a part encountered by a robot may have a slight color or shape deviation from the sample used in programming. In another example, the part does not sit fully aligned with respect to others on a pallet, thereby causing recognition problems.

The third issue is that once programmed, related art industrial robots will not gain any performance improvement or learn from mistakes unless reprogrammed manually. For example, if a bug in the hand coded robot control program causes a collision between the robot gripper and a misaligned object on conveyor, the program itself cannot understand the problem and will repeat the same error again when the same situation occurs. Thus, the robot cannot learn from its mistakes unless taught by a human programmer/operator.

SUMMARY

Example implementations described herein are directed to a Self-learning Industrial Robotic System which is directed to addressing the abovementioned issues.

Through example implementations described herein, the proposed new system provides a cheaper and safer way to train/program a robot. Instead of hand coding the robot for a job, the new system adopts simulation-based reinforcement learning, which allows the robot to learn the job by trial and error in a high-fidelity simulation environment without any human intervention. Since neither the physical asset nor the human programmer is needed, this approach can potentially reduce cost for teaching the robot a new job. Further, since no physical asset is involved in the early stage, any potential damage to physical asset (e.g. robot arm) in the early stage of system development can be avoided, which makes this new system much safer to use.

Through example implementations described herein, the new system can train the robot faster, especially for complex jobs. Since the entire training process runs in a simulation environment hosted by a computer, the proposed system can leverage a divide-and-conquer philosophy by dividing the training tasks into smaller jobs and training many robots in parallel. Eventually, all learned experiences can be easily combined to tackle the original complex tasks. Such example implementations could be easily done at a very low cost with a cloud system.

Through example implementations described herein, the new system can train a robot for jobs that are difficult to program by human coders. In fact, the related art hand coded programs heavily rely on an interpretation of job requirements from the human programmer. As the manufacturing system is becoming more sophisticated, some jobs may involve complex robot motion planning, or, the robot may need to deal with objects with odd shapes and colors, which can be challenging for humans to address through manual programming. In contrast, the proposed new system allows the robot to explore all possible solutions safely in a simulation environment, only based on simplified rules easily programmable by a human coder, (e.g. robot should have no collision with any fixture, or, the object should only be gripped from a particular segment, and so on).

Through example implementations described herein, the proposed new system can continuously improve robot performance over time without involving additional manual programming work, whereas the related art workflow always requires a human programmer to manually inspect, update, and deploy new code. With the new system, even after the baseline model is trained and deployed in production environment, (actual) sensor inputs and corresponding (actual) robot actions are continuously recorded in production. In case the robot fails to accomplish a task in production, (e.g. fails to pick up an object due to small variation in dimension) such performance data will be sent back to the simulation environment, which will recreate the same situation in virtual environment and train the robot until it can accomplish the previously failed task. The updated model will then be deployed back to the production robot, which now gains more experience and can handle the situations that it failed to handle before.

Example implementations can eliminate the requirement for having the physical asset available during training, and can rather utilize a computer system configured with a virtual robot model, virtual controller model and more importantly a virtual environment that allows the virtual robot to try to accomplish the task by itself without direct human input (e.g., via Reinforcement Learning). In addition, even after training and deploying the trained model onto the physical robot, the proposed new system can continuously collect corner cases from the physical environment, regenerate such cases in the virtual environment and update the control strategy model with additional training. Hence, the example implementations described herein can constantly improve robot performance without retraining the robot from scratch.

DETAILED DESCRIPTION

Figure 1:
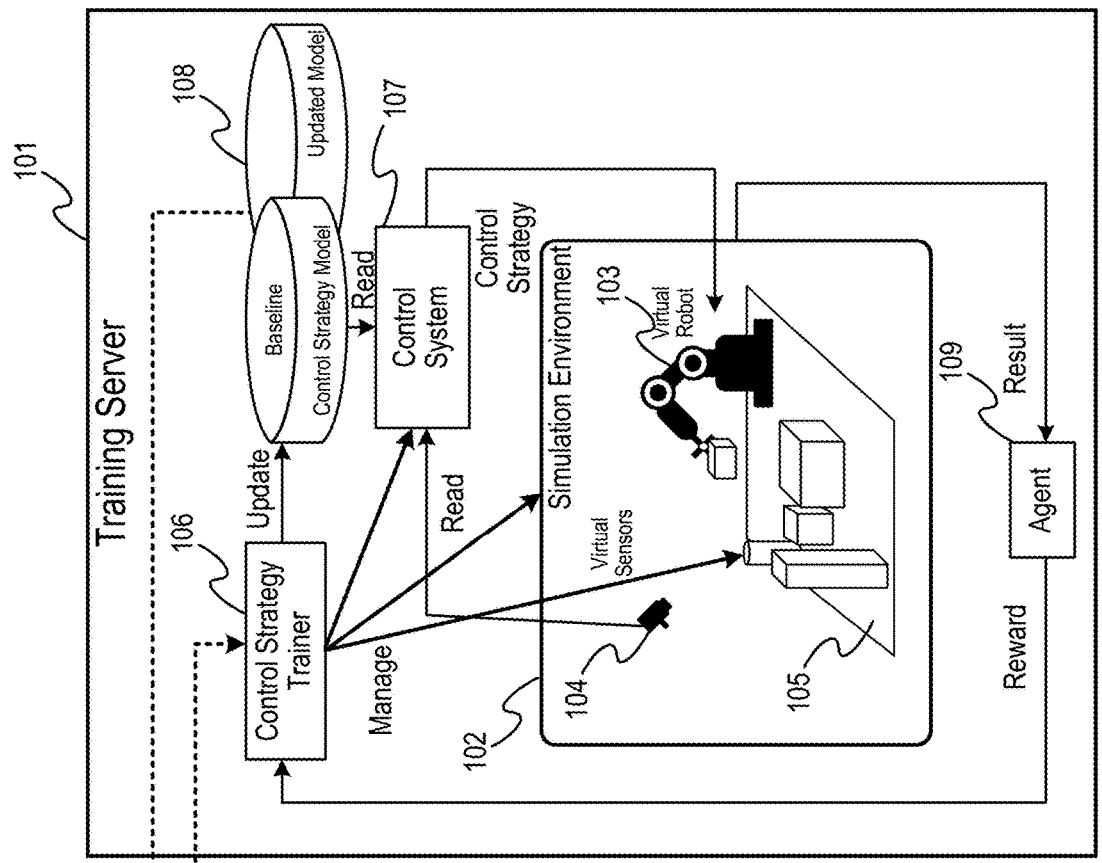
FIG. 1 is an overview of the entire system, in accordance with an example implementation.
Figure 1:
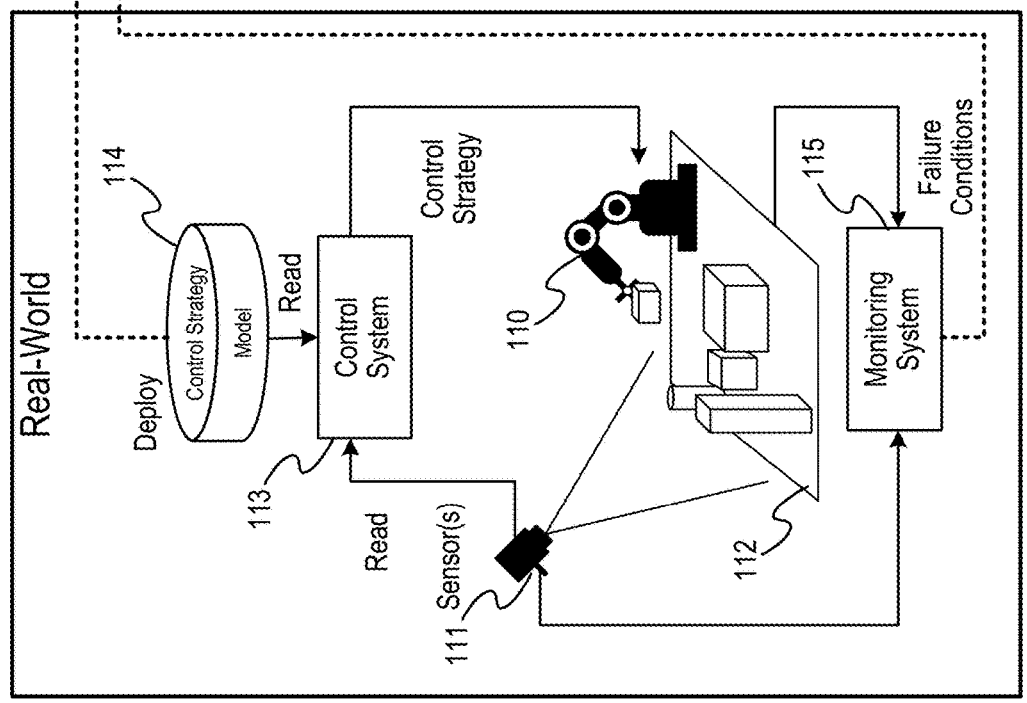

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

FIG. 1 illustrates an overview of the self-learning robotic system, in accordance with an example implementation. In the example of FIG. 1, the self-learning robotic system can involve two aspects: the training server 101 and the real-world environment.

The training server 101 can include a simulation environment 102, control strategy trainer 106, control system 107, control strategy model 108, and training agent 109. In the simulation environment 102, virtual robot 103, virtual sensor(s) 104 and virtual workspace 105 are used to simulate their counterparts in the real-world environment.

On training server 101, the control strategy trainer 106 manages the simulation environment 102, control system 107 and the training agent 109, wherein the simulation environment 102 is responsible for simulating the actual motion of the robot and the physics of the objects found in the real-world environment; the control system 107 generates a robot control strategy based on inputs from virtual sensor 104 and control strategy model 108; the training agent 109 evaluates the performance of the robot and helps the control strategy trainer 106 update the control strategy model 108 iteratively in a training process.

In the real-world environment, there can be physical robot 110, physical sensor(s) 111, physical workspace(s) 112, control system 113, control strategy model 114 and a robot performance monitoring system 115. The control system 113, robot 110, sensor(s) 111 and workspace 112 work similarly to their counterparts on the training server 101. The control strategy model 114 is a copy of the same model 108 generated on training server. In addition, the robot performance monitoring system continuously records outputs from sensor(s) 111 and the performance of robot 110. In case the robot 110 fails to accomplish a job, the failure data is uploaded to control strategy training 106, which will regenerate the failed scenario on the training server 101 and launch an additional training process to further update the control strategy model 108. In the end, the updated control strategy model 108 is deployed back to the real-world environment as an update to control strategy model 114.

As will be described herein, example implementations involve the use of deep reinforcement learning in a simulation environment 102 to provide a control strategy model 108 to be deployed on a robot 110, so that the robot 110 can understand situations through sensors 111 and execute operations accordingly, such as object pickup or locating an object in the case for robotic arms. Sensors 111 can be any kind of sensor utilized to facilitate the operations, such as cameras, stereo cameras, and so on in accordance with the desired implementation. A baseline control model is trained in training server 101, and the control strategy model 108 to be deployed in to the real world environment is executed by control system 113. The control strategy model 108 will be executed by control system 113 and the operations will continue running even if the physical robot fails to accomplish the potential task. Monitoring system 115 will conduct the recording of the performance of the robot. If a robot fails to accomplish a task, the system will send that failed condition or failure scenario back to the training server 101 to control strategy trainer 106. The control strategy trainer 106 will then update the model by recreating that failed scenario in this simulation environment 102 and then retrain the corresponding virtual robot to be able to accomplish the task and avoid the failed scenarios. Once the model is updated by the control strategy trainer 106, it is redeployed as an updated model 108 to update control strategy model 114.

Training server 101 is configured to manage various software packages, including the a control strategy trainer 106, which is used to manage the simulation environment 102 and the real world environment. Control strategy trainer 106 is configured to generate the control strategy model 108, which is either a baseline model or an updated model if there are failure scenarios or other inputs from the real world environment. Control strategy trainer 106 also manages control of the robotic control system 107 in the simulation environment 102 to drive the virtual robots 103 that correspond to the robots 110 in the real world environment. The virtual robot 103 reads the input from the virtual sensors 104 corresponding to the real world sensors 111. During the execution, the control strategy trainer 106 manages the virtual robots 103 to accomplish the task within the defined workspace 105, which is the area of operation of the corresponding virtual robot and as corresponding to the physical workspace of the corresponding physical robot in the real world environment.

To train the virtual robots 103, the agent 109 is used to facilitate reinforcement learning. At first, when there is only an initialized base model, the virtual robots 103 conduct random operations, the outcomes of which are interpreted by the agent 109 (e.g., failed or successful operation), and the agent 109 assigns a reward to that operation as provided by the initialized base model. The reward will be sent back to the control strategy trainer 106, which will then update the control strategy model 108.

After sufficient iterations (e.g., greater than 10,000 iterations), the virtual robot 103 will be able to accomplish the task as pre-defined in the control strategy model 108 as managed between the agent 109 and the control system 107. Once the control strategy model 108 is updated, it will be deployed to the real world environment as the actual control strategy model 114 and executed on a real control system 113, which drives the corresponding physical robot 110 that is operating in the same workspace and conducting the same operations in the physical world as the virtual robot 103 had conducted in the simulation environment 102.

Monitoring system 115 is configured to continuously record the input from the sensors 111 and also the performance of the robot 110. Should any failure in the robot operation occur, the monitoring system will send the failure scenario back to the training server 101 which will then train a virtual robot 103 under the same failure scenario until the virtual robot 103 learns how to do conduct the operation without incurring failure. The control strategy model 108 is then updated and redeployed back to the real world environment.

In example implementations, the failure scenario can involve the initial conditions of the workspace, including the input provided to the robot 110 from the control strategy model 108, the position of the object with respect to the workplace as provided by sensors 111, and so on. The failure scenario can be in the form of images of the workspace and data involving the operation to be completed, sensor measurements that are used as inputs for the virtual sensors, and any other data describing the condition for the physical robot 110, and including data indicating that the operation has failed. Based on the failure scenario, the simulation environment 102 recreates the failure scenario and is informed that failure has occurred for conducting the operations output by the control strategy model 108. Thus, the control strategy trainer 109 will configured the virtual robot 103 to attempt a different task to conduct the operation.

Through the example implementations as described herein, reinforcement learning can be applied to control strategy models deployed in the real world environment on a simulation environment to improve the models in case of failures in the real world environment. The updated models can then be deployed on the control system in the real world environment without requiring stoppage of operations in the real world environment. Such example implementations are an improvement to related art systems that do not utilize any monitoring system or reinforcement learning to update deployed control strategy models. Related art implementations have to stop the real world environment to redesign the control strategy model and regenerate various scenarios before the real world environment can continue. By monitoring the performance of the robots in the real world environment and providing the failure scenarios to a training server managing a simulation environment, the simulation environment can then train against the failure scenarios and incrementally improve the performance of the robots in the real world environment.

Figure 2:
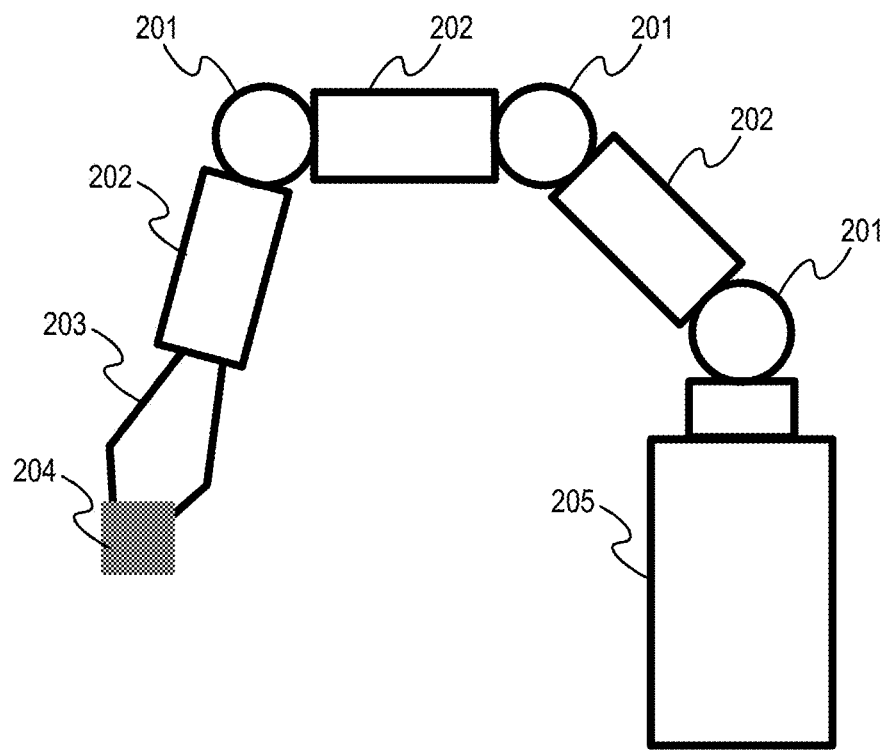
FIG. 2 is an example of an industrial robot used by the proposed system, in accordance with an example implementation.

FIG. 2 is an example of industrial robot arm used in the proposed system, in accordance with an example implementation. The industrial robot arm can involve multiple joints 201, multiple links 202, a gripper 203 that grips an object 204 and a base 205 that hosts the entire system from the floor. As each joint 201 is configured to rotate within a range of angles, the entire robot arm can move accordingly within a range. The gripper 203 can open and close so as to pick up and drop off an object.

Figure 3:
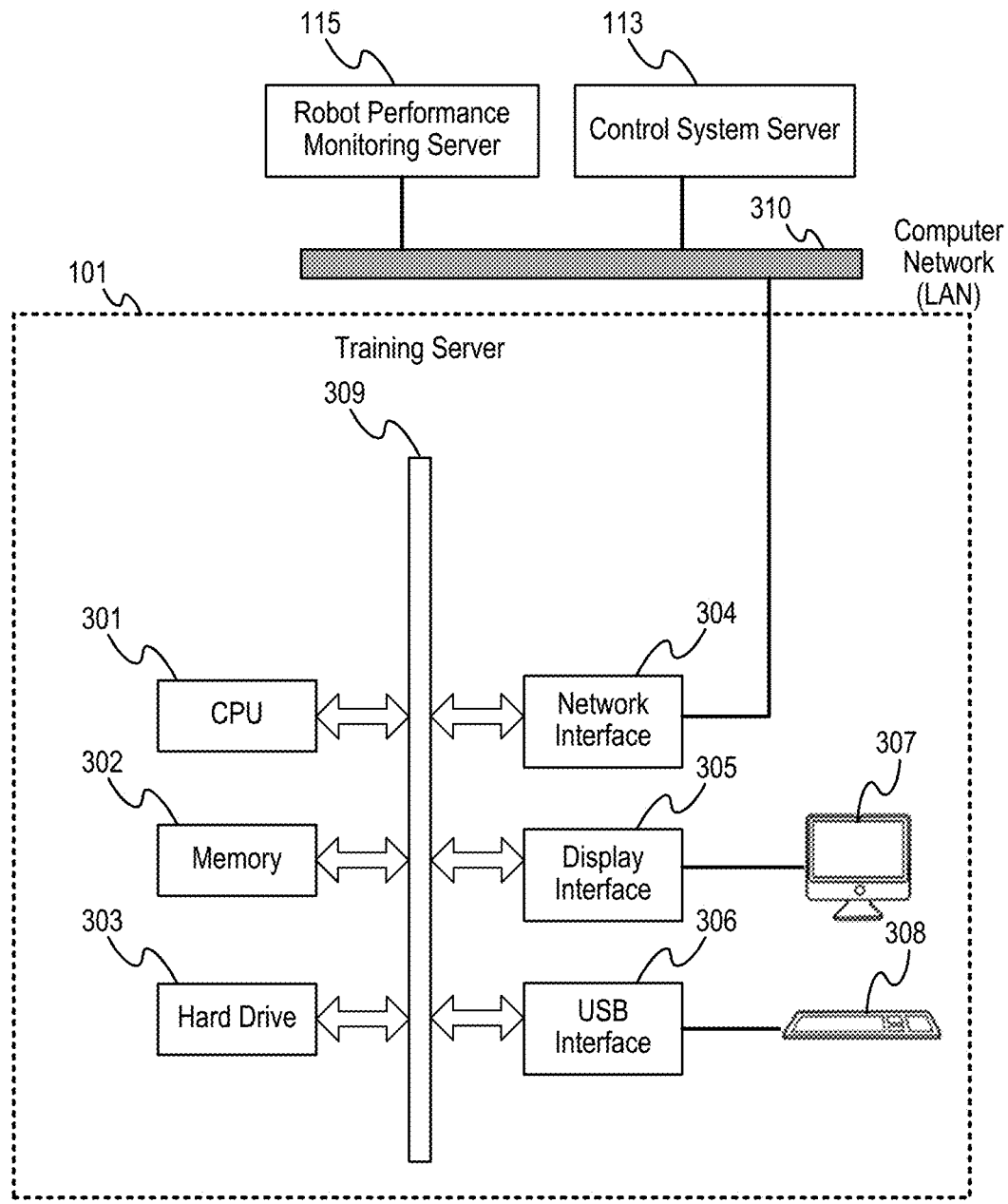
FIG. 3 is an example of the training server used by proposed system to train robot in a virtual environment, in accordance with an example implementation.

FIG. 3 is an example of the training server 101, in accordance with an example implementation. Training server 101 can include one or more central processing units (CPU) 301, memory modules 302, hard drive 303 and a network interface 304 connected to a local area network (LAN) 310 that is further connected with robot control system server 113 and robot performance monitoring system server 115. For the convenience of maintenance, a monitor 307 and keyboard 308 can also be installed through the display interface 305 and universal serial bus (USB) interface 306. All mentioned components communicate through a bus 309. Depending on the desired implementation, CPUs 301 can be in the form of physical hardware processors, or a combination of hardware and software processors.

Figure 4:
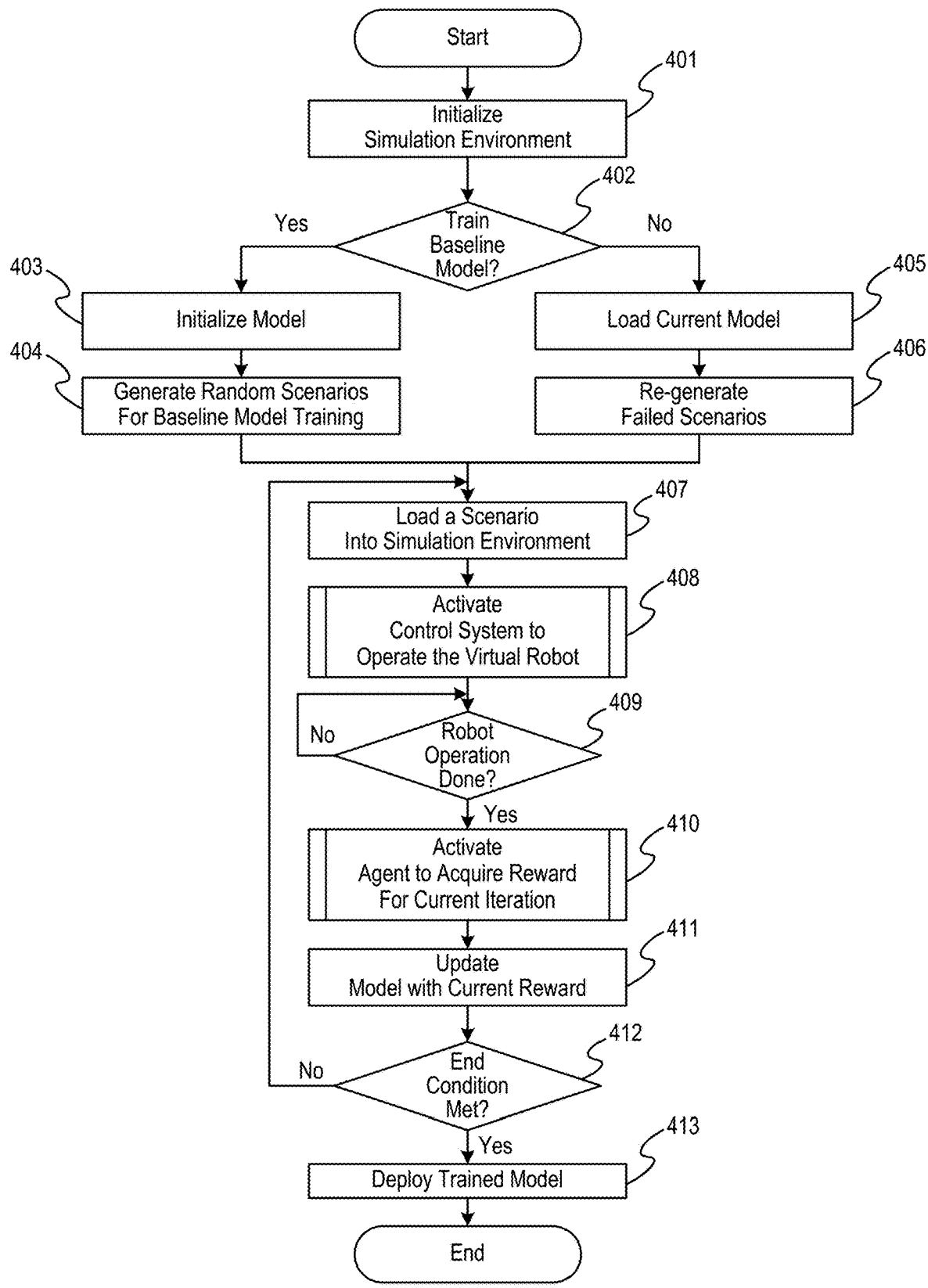
FIG. 4 is the workflow of the control strategy trainer running on the training server, in accordance with an example implementation.

FIG. 4 illustrates an overall workflow of control strategy trainer 106, in accordance with an example implementation. The control strategy trainer 106 initializes the training in the simulation environment, and determines if the simulation is directed to baseline model training (e.g., new model needed for a new system), or if it is incremental training (e.g., to update a control strategy model of a current system).

Upon launching, in step 401, control strategy trainer 106 initializes the simulation environment 102. In step 402, the control strategy trainer 106 checks whether a baseline model needs to be trained. When baseline model training is requested (Yes), the process proceeds to step 403, in which an empty control strategy model 108 is initialized. In step 404, a large number of random scenarios are generated for simulation environment 102. In step 407, the control strategy trainer 106 loads a single randomly generated scenario into the simulation environment 102. In step 408, the control strategy trainer 106 activates the control system 107, which will generate the control strategy based on inputs from sensor 104 and current control strategy model 108, and then drives the robot to accomplish the task in workspace 105. In step 409, the control strategy trainer 106 will wait until robot 103 completes the job, since it may take a period of time to complete the operation.

In step 410, after robot 103 completes the task, the training agent 109 is activated to critique the robot performance through the use of reinforcement learning, which involves assigning reward scores for each operation and iterating the operations. In step 411, the control strategy trainer 106 updates the current control strategy model 108 based on the actual reward from training agent 109 and expected reward from the control strategy model 108. For example, if the control strategy model 108 suggests a pickup operation at a specific region in the workplace by giving a high expected reward score r1 for that region, but the robot 103 eventually failed to accomplish such task and received a very low score r2, then the model 108 will be updated according to the difference between r1 and r2, which is r2−r1. As such process iterates thousands or even tens of thousands of times, the control strategy model 108 will receive a sequence of incremental updates that will cause the model to become sufficient in accomplishing the job.

Referring to step 405, if only incremental updates to the control strategy model 108 are needed (e.g. real robot failed in an action in real-world) (No), the control strategy trainer 106 will load the current model and then re-generate failure scenarios in step 406. The rest of the training process from step 407 through 412 remains the same. In step 413, once the end condition is met, the updated model is then copied to its counterpart 114 in the real-world environment.

Figure 5:
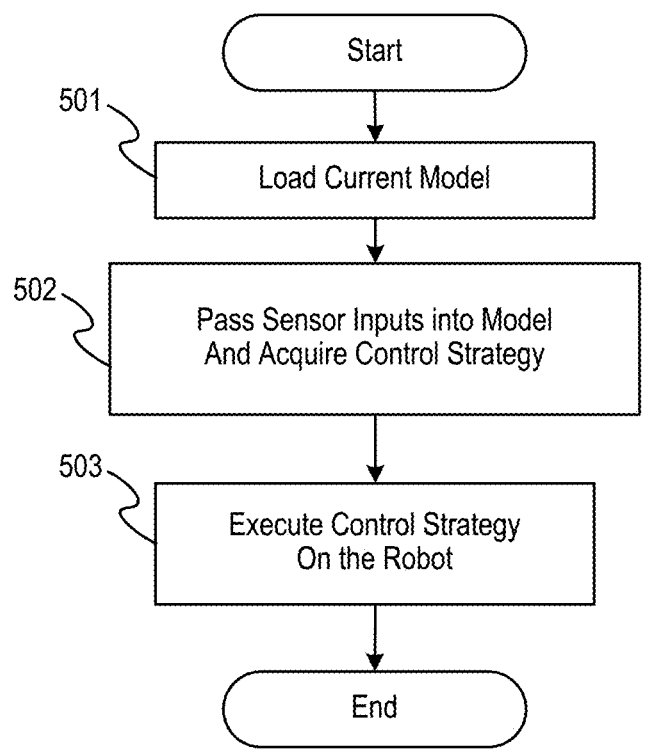
FIG. 5 is the workflow of the control system running on both the training server and the real-world environment, in accordance with an example implementation.

FIG. 5 illustrates the workflow of the control system running on both the training server and the real-world environment, in accordance with an example implementation. Specifically, FIG. 5 is a detailed explanation of step 408 in FIG. 4. In step 501, the control system 107 loads the current/latest control strategy model 108. In step 502, the control system 107 passes the inputs from sensor 104 into the control strategy model 108 and acquires a control strategy. In step 503, the control system 107 drives the robot 103 to complete the operation based on such control strategy.

Figure 6:
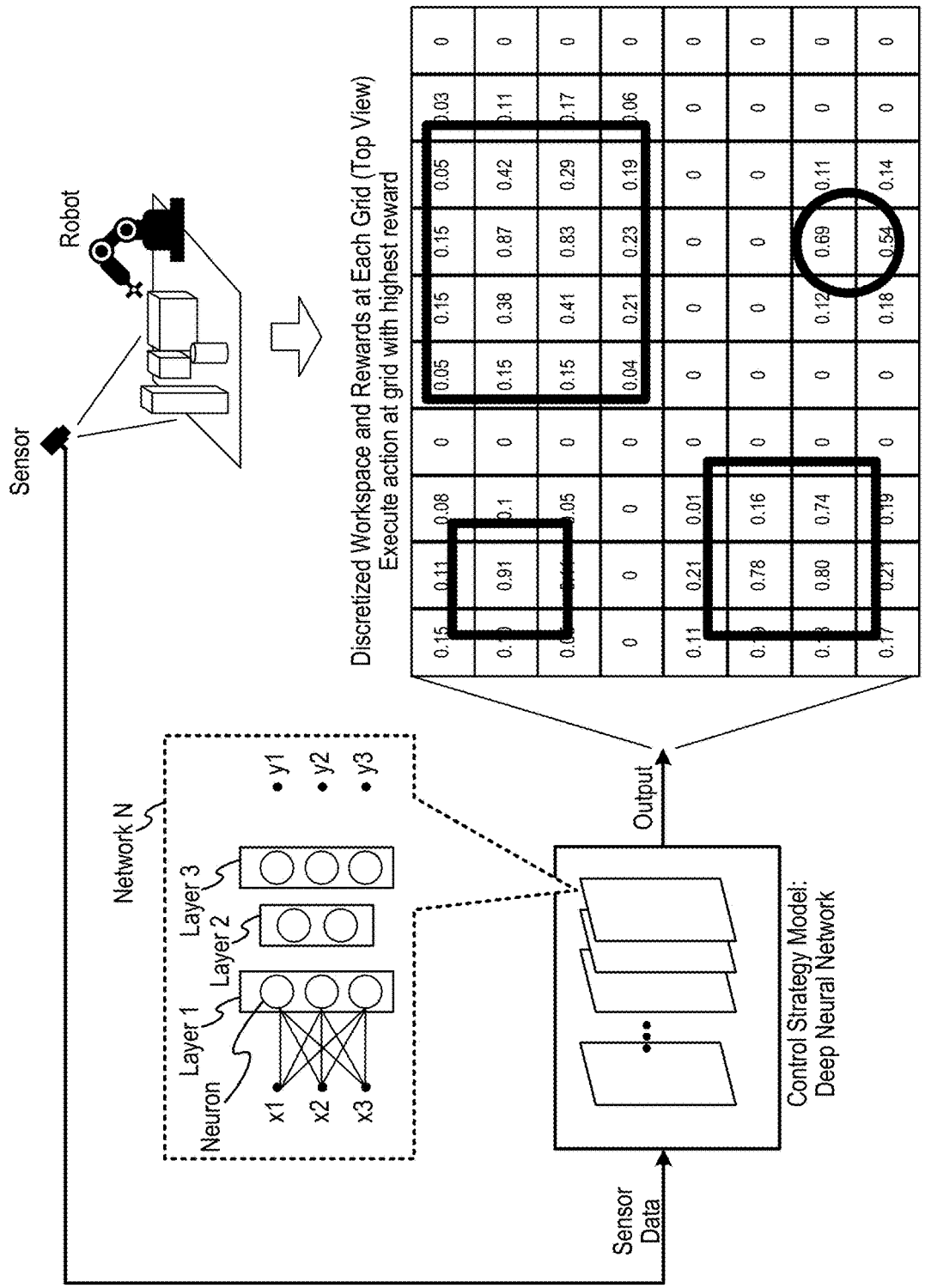
FIG. 6 is an example of Deep Neural Network Model used in the proposed system, in accordance with an example implementation.

FIG. 6 is an example of the control strategy model 108 trained on the training server 101, in accordance with an example implementation. In the example of FIG. 6, the control strategy model 108 is structured as a Deep Neural Network, which involves multiple layers of Neural Networks that are built upon layers of neurons. Each input, such as x1, x2 and x3 is multiplied by a weight w corresponding to the input, and the corresponding neuron outputs the sum of such values to next layer of neurons. This sequence operation continues through multiple layers of neurons until output are generated, such as y1, y2 and y3. In the proposed system, an example of the output from the Deep Neural Network can be a matrix representing numerical reward scores for a discretized/gridded rectangular shaped workspace. The reward score at a grid indicates the confidence for robot to accomplish an operation at such location in actual workspace. For instance, as in the figure, picking up a square object from the middle part always yields a higher reward score than other part of the object, such as the corners. For control system 107, in each run, the grid with highest reward score will be selected. The operation will be executed by the robot 103 at corresponding location.

As illustrated in FIG. 6, the strategy generated from the model is determined from the reinforcement learning applied to the deep neural network. For example, the rectangular-shaped workspace is discretized into grids as illustrated in FIG. 6, wherein some camera or other optical sensors are disposed to monitor the workplace. In an example in which the task involves having the robot pick up an object successfully, the sensor data is passed to the deep neural network. The output of the deep neural network is the discretized workplace with rewards assigned to each grid that are correlated to the probability of successfully completing the operation. Thus, high reward grids are the target of the robot for executing a pickup operation at the given coordinate based on the detected objects in the simulation environment (e.g., four objects indicated in solid lines in the example of FIG. 6). The grids not close to the object tend to have smaller rewards or zero rewards. Thus, based on the discretized grids, the robot will conduct a pickup operation at the grid with the highest reward by moving the gripper to the corresponding location and closing the gripper to grab the object.

Figure 7:
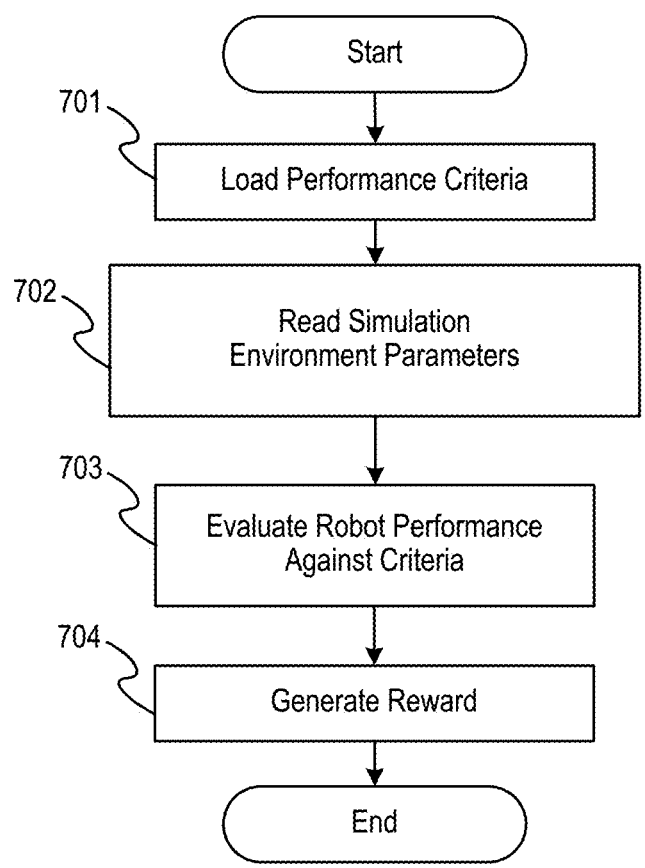
FIG. 7 is the workflow of the training agent running on the training server, in accordance with an example implementation.

FIG. 7 illustrates a workflow of the training agent 109, in accordance with an example implementation. In step 701, it loads the performance criteria that are to be used to critique the robot performance. For example, it can be "the object must be picked up from the floor", or, "the robot should have no collision with any object in the workplace." Such criteria can be any criteria set in accordance with the desired implementation. In step 702, the training agent 109 extracts the parameters from the current simulation environment 102 to understand the situation before and after the robot operation. The simulation parameters can involve aspects of the simulation environment or the operation, such as the boundary of the workplace or that a failure condition can involve pushing the object off of the workplace. In step 703, the training agent 109 evaluates the result of the robot operation against the criteria received in step 701. For example, to understand if an object is picked up by the robot, the training agent 109 will examine the coordinates of each object and robot gripper. If one object is no longer sitting on the workplace and is co-located with the center of the robot gripper, then this object is successfully picked up by the robot. In step 704, based on the evaluation result in the prior step, the training agent 109 generates a reward score for the latest operation of the robot. For example, the reward score can be 1.0 if an object is successfully picked up, or 0 otherwise.

Figure 8:
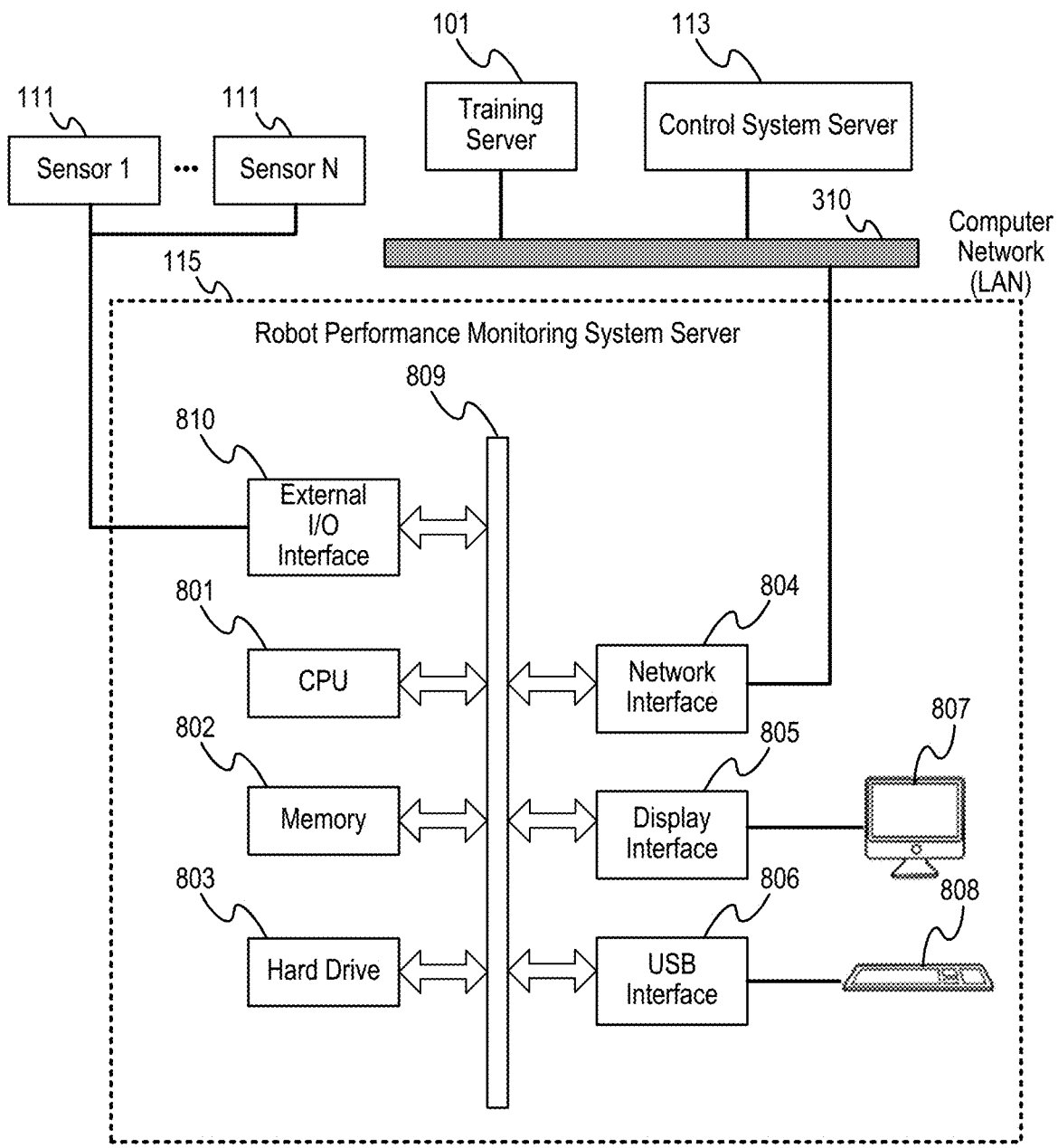
FIG. 8 is an example of the robot performance monitoring server used in a real-world environment, in accordance with an example implementation.

FIG. 8 is an example of the robot performance monitoring system server, in accordance with an example implementation. In the example of FIG. 8, which can involve one or more CPUs 801, memory modules 802, hard drive 803 and a network interface 804 connected to LAN 310 that is further connected with training server 301 and robot control system server 113. For the convenience of maintenance, a monitor 807 and keyboard 808 can also be installed through the display interface 805 and USB interface 806. In addition, the robot performance monitoring system server has an Input/Output (I/O) interface 810 to communication with external devices, such as sensors 111. All mentioned components communicate through a bus 809.

Figure 9:
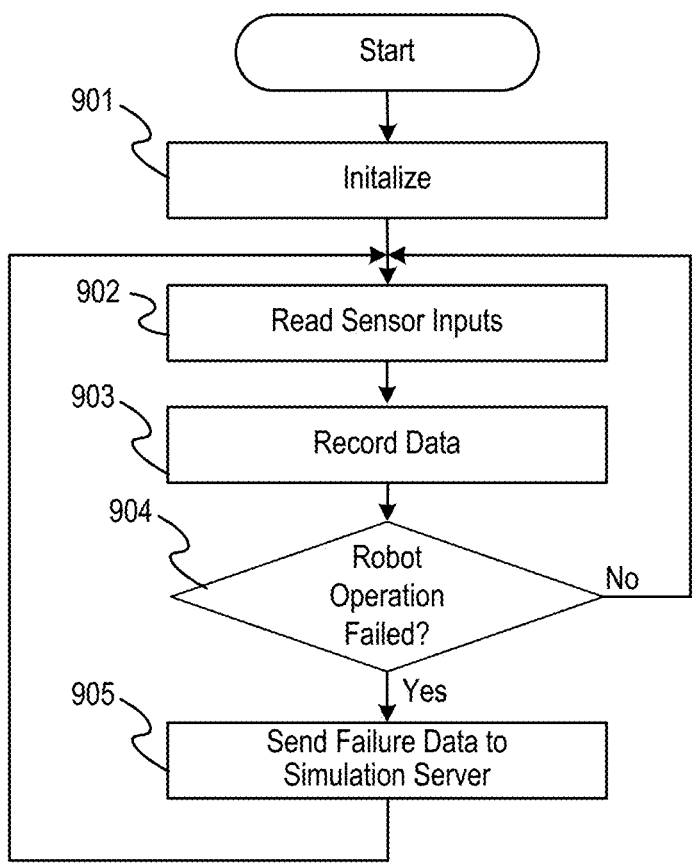
FIG. 9 is the workflow of the robot performance monitoring server, in accordance with an example implementation.

FIG. 9 is the workflow of the robot performance monitoring system 115, in accordance with an example implementation. In step 901, the robot performance monitoring system 115 initializes itself. In step 902, the robot performance monitoring system 115 reads inputs from sensor 111. In step 903, the robot performance monitoring system 115 stores the data on the server. In step 904, the robot performance monitoring system 115 judges the result of latest robot operation. If the robot works properly (No), it will loop back to step 902 for next iteration. If the robot fails to operate properly (Yes), it will send the failure data in step 905 to the control strategy trainer 106 residing on the training server 101 through LAN 310. The control strategy trainer 106 will then re-generate the same scenario in simulation environment 102, train the virtual robot 103 and eventually update the control strategy model 108 that can handle the previously failed situation. The updated model 108 will then be copied back to the control system server to replace the previously deployed model 114.

Figure 10:
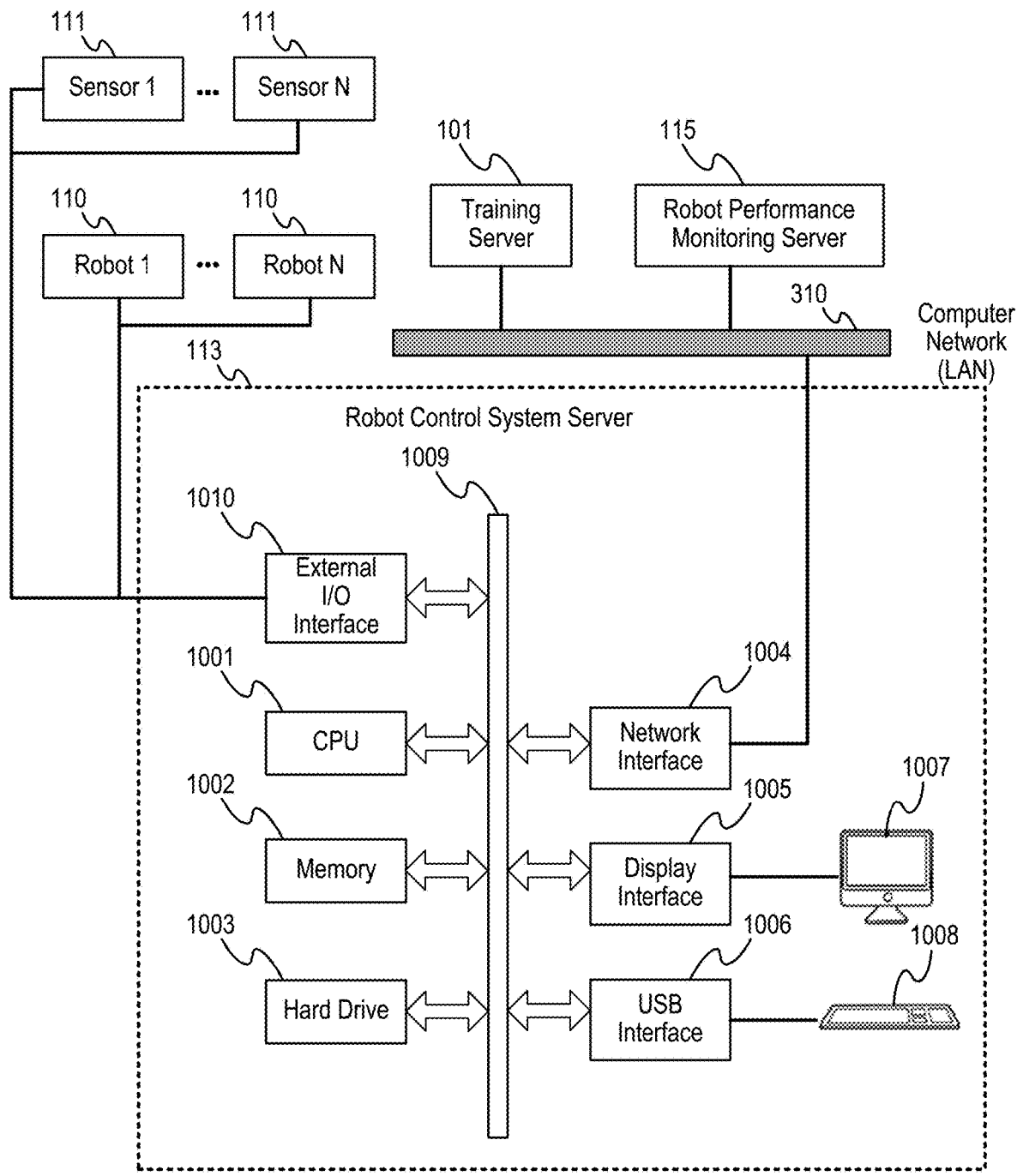
FIG. 10 is an example of the robot control system server used in the real-world environment, in accordance with an example implementation.

FIG. 10 is an example of the robot control system server 113, in accordance with an example implementation. Robot control system server 113 can involve one or more CPUs 1001, memory modules 1002, hard drive 1003 and a network interface 1004 connected to a LAN 310 that is further connected with training server 101 and control system server 113. For the convenience of maintenance, a monitor 1007 and keyboard 1008 can also be installed through the display interface 1005 and USB interface 1006. In addition, the robot control system server 113 also has an I/O interface 1010 to communication with external devices. It receives input from sensors 111 and sends out control command to robot 111. All mentioned components communicate through a bus 1009. The functionalities of the robot control system server 113 are generally the same as its counterpart 107 on training server. The workflow is described with respect to FIG. 5.

The self-learning robotic system introduced in the example implementations herein can be applied to any industrial robot for manufacturing, warehousing, material handling and other applications that require industrial robots to accomplish complex jobs.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
   loading a scenario into a simulation environment comprising one or more virtual robots and one or more virtual sensors;
   executing a control strategy model on the simulation environment to operate the one or more virtual robots based on the scenario; and
   training the control strategy model from feedback from the one or more virtual sensors of the simulation environment,
   wherein the control strategy model is configured to assign an expected reward for each operation completed by the one or more virtual robots in the simulation environment, wherein the training the control strategy model from the feedback from the one or more virtual sensors of the simulation environment comprises:
   for the each operation completed by the one or more virtual robots in the simulation environment:
      determining a reward to be assigned for the each operation completed by the one or more virtual robots in the simulation environment based on sensor data from the one or more virtual sensors; and
      updating the control strategy model based on the determined reward to be assigned and the expected reward to be assigned by the control strategy model.

2. The method of claim 1, wherein the control strategy model is an initialized baseline model, and the scenario is a randomly generated scenario.

3. The method of claim 1, wherein the control strategy model is extracted from a control system of a real world environment comprising one or more robots corresponding to the one or more virtual robots and one or more sensors corresponding to the one or more virtual sensors, and wherein the scenario is a failure scenario extracted from a monitoring system of the real world environment.

4. The method of claim 1, wherein the one or more virtual robots are robotic arms.

5. The method of claim 1, further comprising updating a control system of a real world environment with the trained control strategy model, the real world environment comprising one or more robots corresponding to the one or more virtual robots and one or more sensors corresponding to the one or more virtual sensors.

6. A method for a control system of a real world environment comprising one or more robots and one or more sensors, the method comprising:
   executing a control strategy model trained by a simulation environment comprising one or more virtual robots corresponding to the one or more robots and one or more virtual sensors corresponding to the one or more sensors, the control strategy model configured to control the one or more robots based on sensor data of the one or more sensors,
   monitoring the real world environment for one or more failure scenarios detected from sensor data of the one or more sensors; and
   providing the one or more failure scenarios to the simulation environment,
   wherein the control strategy model is configured to assign an expected reward for each operation completed by the one or more virtual robots in the simulation environment, wherein training of the control strategy model comprises:
      for the each operation completed by the one or more virtual robots in the simulation environment:
         determining a reward to be assigned for the each operation completed by the one or more virtual robots in the simulation environment based on sensor data from the one or more virtual sensors; and
         updating the control strategy model based on the determined reward to be assigned and the expected reward to be assigned by the control strategy model.

7. The method of claim 6, further comprising receiving and deploying an updated control strategy model from the simulation environment in response to providing the one or more failure scenarios.

8. The method of claim 6, wherein the one or more robots are robotic arms.

9. The method of claim 6, wherein the execution of the control strategy model comprises, for the each operation completed by the one or more robots, controlling the one or more robots to maximize the expected reward for the each operation.

10. A first server communicatively coupled to a second server configured to manage a real world environment comprising one or more robots and one or more sensors, the first server configured to manage a simulation environment comprising one or more virtual robots corresponding to the one or more robots, and one or more virtual sensors corresponding to the one or more sensors, the first server comprising:
   a processor, configured to:
      load a scenario into the simulation environment;
      execute a control strategy model on the simulation environment to operate the one or more virtual robots based on the scenario; and
      train the control strategy model from feedback from the one or more virtual sensors of the simulation environment,
      wherein the control strategy model is configured to assign an expected reward for each operation completed by the one or more virtual robots in the simulation environment, wherein the processor is configured to train the control strategy model from the feedback from the one or more virtual sensors of the simulation environment by:
         for the each operation completed by the one or more virtual robots in the simulation environment:
            determining a reward to be assigned for the each operation completed by the one or more virtual robots in the simulation environment based on sensor data from the one or more virtual sensors; and
            updating the control strategy model based on the determined reward to be assigned and the expected reward to be assigned by the control strategy model.

11. The first server of claim 10, wherein the control strategy model is an initialized baseline model, and the scenario is a randomly generated scenario.

12. The first server of claim 10, wherein the control strategy model is extracted from a control system of the real world environment, and wherein the scenario is a failure scenario provided by the second server.

13. The first server of claim 10, wherein the one or more virtual robots are robotic arms.

14. The first server of claim 10, wherein the processor is configured to update a control system of a real world environment with the trained control strategy model.

* * * * *